United States Patent
Suzuki

(10) Patent No.: US 7,602,295 B2
(45) Date of Patent: Oct. 13, 2009

(54) RADIO-COMMUNICATION APPARATUS AND METHOD FOR ENABLING RADIO-COMMUNICATION BETWEEN RADIO-COMMUNICATION APPARATUS AND DATA CARRIER

(75) Inventor: Shigeaki Suzuki, Shizuoka-ken (JP)

(73) Assignee: Toshiba TEC Kabushiki Kaisha, Tokyo (JP)

( * ) Notice: Subject to any disclaimer, the term of this patent is extended or adjusted under 35 U.S.C. 154(b) by 368 days.

(21) Appl. No.: 11/696,958

(22) Filed: Apr. 5, 2007

(65) Prior Publication Data
US 2008/0036607 A1    Feb. 14, 2008

(30) Foreign Application Priority Data
Apr. 26, 2006    (JP)    ............... 2006-122491

(51) Int. Cl.
G08B 13/14    (2006.01)
(52) U.S. Cl. ................... 340/572.1; 340/572.7
(58) Field of Classification Search .............. 340/572.1, 340/572.7, 572.8, 686.1, 10.1; 235/475; 400/583
See application file for complete search history.

(56) References Cited

U.S. PATENT DOCUMENTS

| | | | |
|---|---|---|---|
| 2006/0220859 A1* | 10/2006 | Nagai et al. | 340/572.1 |
| 2006/0222430 A1* | 10/2006 | Duckett et al. | 400/583 |
| 2007/0008136 A1 | 1/2007 | Suzuki | |
| 2008/0231419 A1* | 9/2008 | Mizukawa et al. | 340/10.1 |
| 2008/0257964 A1* | 10/2008 | Tsuchiya | 235/475 |

FOREIGN PATENT DOCUMENTS

| | | |
|---|---|---|
| JP | 2003-140548 | 5/2003 |
| JP | 2005-332318 | 12/2005 |

* cited by examiner

Primary Examiner—Van T. Trieu
(74) Attorney, Agent, or Firm—DLA Piper LLP (US)

(57) ABSTRACT

A radio-communication apparatus carries out movement of a dielectric element toward an antenna of RFID reader/writer when the RFID reader/writer cannot perform within a predetermined time radio-communication with a data carrier mounted on the RFID label that is arranged on a rolled base sheet passing between the dielectric element and the antenna. The movement is performed step by step to stop the dielectric element at positions at each of which the radio-communication is executed until the reader/writer can perform radio-communication with the data carrier within the predetermined time at any one of the positions.

8 Claims, 4 Drawing Sheets

FIG. 4

| POSITION | REQUIRED PULSE |
|----------|----------------|
| HP | k0 |
| P1 | k1 |
| P2 | k2 |
| ⋮ | ⋮ |
| PN | kn |

51

| PULSE COUNTER | x |
|---------------|---|

53

RADIO-COMMUNICATION APPARATUS AND METHOD FOR ENABLING RADIO-COMMUNICATION BETWEEN RADIO-COMMUNICATION APPARATUS AND DATA CARRIER

BACKGROUND OF THE INVENTION

1. Field of the Invention

This invention relates, in general, to a radio-communication apparatus. In particular, the invention relates to an apparatus that carries out radio-communication with data carriers, e.g., RFID (Radio Frequency Identification) tags, and reads and/or writes data from and/or into such data carriers. The invention also relates to a method for enabling radio-communication between a radio-communication apparatus and data carriers.

2. Description of the Related Art

In recent years, RFID labels draw one's attention to manage articles to be sold, for example. RFID label includes a label sheet and an RFID tag well known in the art, having an IC chip and an antenna and the RFID tag is attached to the label sheet. RFID label has advantages that a large number of data are stored in the IC chip, data is read and/or written from and/or to the IC chip with non-contact manner using an electromagnetic waves and thus influence of stain and/or dust can be prevented, and data stored in each IC chip of a plurality of RFID labels can be read collectively within a short time.

Such RFID labels are attached to respective articles to be sold and information regarding each article is stored in IC chip of respective RFID labels. In this case, it is required to print information such as an article name on the surface of each label to enable a visible inspection or recognition by an operator or a consumer.

Japanese laid-open (kokai) patent No. 2005-332318 discloses a printing apparatus that uses a continuous rolled base sheet on which a plurality of RFID labels are peelably arranged in line. Using a radio-communication, data is stored in an IC chip of respective RFID labels which are sequentially conveyed along with the base sheet while the base sheet is wound up and, a required information is printed on respective RFID labels m sequence.

A usable frequency band of electromagnetic waves of UHF band in RFID technology is different in every country or region. For example, a usable frequency band is 950 MHz to 956 MHz in Japan, 902 MHz to 928 MHz in U.S.A. and 862 MHz to 868 MHz in Europe, respectively Thus, a radio-communication apparatus commonly usable in such countries or regions needs a large external size of an antenna that covers all of the above-described frequency bands or to selectively use antennas each of which is designed exclusively for each country or region. It is difficult to employ however, such a large antenna to an apparatus whose external size is required to be small in the former case and a cost is increased to prepare such plural kinds of antenna in the latter case.

The above-described Japanese laid-open (kokai) patent also discloses a radio-communication apparatus that a dielectric element is located at a position through which electromagnetic waves radiated from the antenna pass and a distance from the dielectric element to the antenna is controlled depending on the country or region where the apparatus is used to adjust the frequency characteristic of the antenna to a specific frequency band of the country or region. This operation is based on a phenomenon that the frequency characteristic of an antenna varies with influence of a dielectric element against the antenna when the dielectric element is located near the antenna. Therefore, the above-described problems can be solved by the Japanese laid open (kokai) patent.

In the meantime, as described above, a usable frequency band of electromagnetic waves of UHF band in RFID technology is respectively determined in each country or region. Thus, it is required to design RFID tags so that, in RFID labels using the RFID tags, read and/or write of data can be performed precisely with electromagnetic waves of a specific frequency band that is determined in the country or region where RFID labels are used.

In general, RFID labels are attached to various articles and thus it is well known that a specific frequency band, of RFID tags may greatly vary with a dielectric factor of articles to which RFID labels are respectively attached.

For example, in a case that RFID label is attached to an article that is made of a relatively thick paper material e.g., hook, the optimum frequency of the RFID tag decreases about 50 MHz from an original optimum frequency. In Japan, since a usable frequency band, of electromagnetic waves of UHF band is determined 950 MHz to 956 MHz, RFID tag is exclusively designed such that the optimum frequency thereof is to be 1,0000 MHz, considering beforehand the fact that the optimum frequency decreases about 50 MHz therefrom (1,000 MHz) as described above when the RFID label on which the RFID tag is mounted is attached to a book.

Similarly in a case that RFID label is attached to an article that is made of a relatively thick plastic material, e.g., plastic box, the optimum frequency of RFID tag decreases about 70 MHz from an original optimum frequency thereof. Therefore, RFID tag is exclusively designed such that the optimum frequency is determined to 1,020 MHz, considering that the optimum frequency practically decreases about 70 MHz therefrom (1,020 MHz) when the RFID label on which the RFID tag is mounted is attached to a plastic box.

Furthermore, in a case that RFID label is attached to an article made of a thin material, e.g., article tag, or is used, alone, the optimum frequency of such RFID tags is determined to 950 MHz. This is because that the optimum frequency thereof does not vary even if the RFID label is attached to such a thin material.

As described above, optimum frequencies of RFID tags are different from one another depending on. RFID labels exclusively manufactured for specific articles to which RFID labels are attached.

Therefore, the optimum frequency of RFID tags varies depending on articles to which RFID labels are attached even in the same country or region. In response to this circumstance, it is understood that a dielectric material is located near the antenna and a distance between the antenna and the dielectric material is controlled at a precise value to adjust the optimum frequency of the antenna to a usable frequency band in the country or region where RFID labels are used.

However, it is troublesome operation to manually regulate the distance between the antenna and the dielectric material to adjust the optimum frequency of RFID tag every time a kind of RFID label is changed. A practical solution is desired.

SUMMARY OF THE INVENTION

Accordingly, It is an object of the present invention to easily adjust the optimum frequency of a data carrier, e.g., RFID tag, without a troublesome operation.

To accomplish the above object, a radio-communication apparatus of the present invention that carries out a data read/write operation to RFID labels peelably mounted on a base sheet, comprising:

an antenna configured to perform transmission or reception of radio waves;

a reader/writer configured to execute radio-communication with the RFID label through the antenna to carry out the data read/write operation when one of the RFID labels comes to a radio communicable area of the antenna;

a dielectric element facing the antenna, the base sheet on which RFID labels are mounted moving between the dielectric element and the antenna;

a moving mechanism configured to regulate a relative distance between the dielectric element and the antenna if the reader/writer cannot execute radio-communication with the one of the RFID labels; and a control section configured to control the operation of the moving mechanism to enable radio-communication between the reader/writer and the one of the RFID labels.

BRIEF DESCRIPTION OF THE DRAWINGS

These and other objects and advantages of this invention will become more apparent and more readily appreciated from the following detailed description of the presently preferred exemplary embodiments of the invention taken in conjunction with the accompanying drawings wherein:

FIG. 4 is a view illustrating a management table used in one embodiment of the present invention.

DETAILED DESCRIPTION OF THE INVENTION

Figure 1:
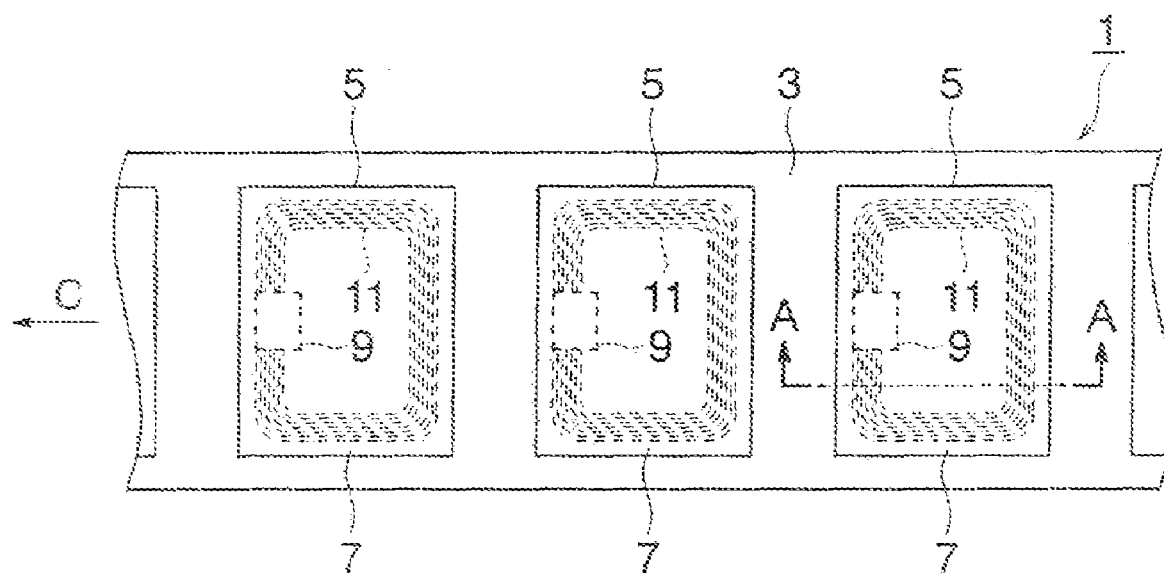
FIG. 1 is a schematic view illustrating part of a continuous rolled label sheet on which a plurality of RFID labels are arranged in line.

Preferred embodiment of the present invention will now be described in more detail with reference to the accompanying drawings. However, the same numerals are applied to the similar elements in the drawings, and therefore, the detailed descriptions thereof are not repeated.

In this embodiment, the invention is applied to an RFID label printer that produces RFID labels to be attached to articles as a label for managing inventory or sale of articles.

Firstly, an RFID label sheet used in this embodiment will be described with, reference to FIGS. 1 and 2.

Figure 2:
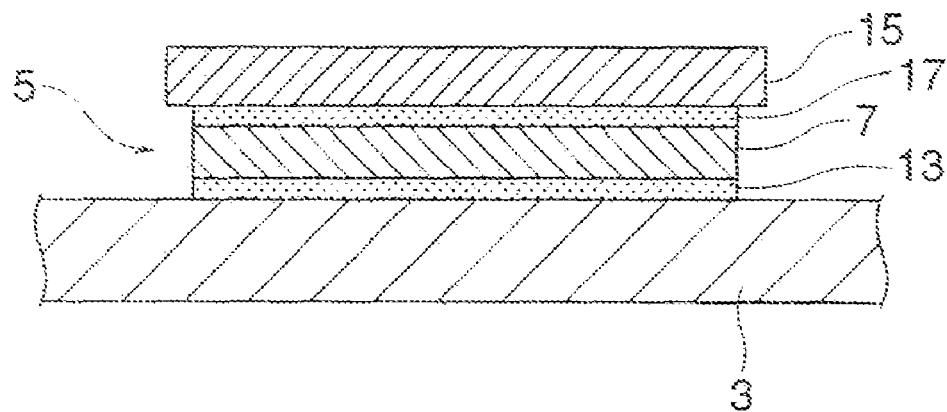
FIG. 2 is an enlarged sectional view illustrating the label sheet, with RFID label taken along lines A-A in FIG. 1.

As shown in FIG. 1, an RFID label sheet 1 includes a belt-shaped base sheet 3, and a plurality of RFID labels 5 that are arranged in line in a sheet convey direction C and pasted on the surface of the base sheet 3 in a peelable fashion. Each RFID label 5 includes an RFID tag 7, including an IC chip 9 and an antenna 11 folded with a thin film, which is attached to the base sheet 3 with a paste 13 in a peelable fashion and a label sheet 15 attached to the RFID tag 7 with a paste 17, as shown in FIG. 2. A front surface of the label sheet 15 serves as a printing surface.

In this embodiment, the RFID tag 7 is a passive type data carrier and thus no power source, e.g., battery, is provided. The IC chip 9 of the RFID tag 7 includes a power generating section, a modulation section, a demodulation section, a memory section and a control section that controls operation, of each section, as is well known in the art. The power generating section generates power by rectifying and stabilizing radio waves (electromagnetic waves) received by the antenna 11 to provide power to each section. The demodulation, section demodulates the radio waves received, by the antenna 6 to forward it to the control section. The modulation section modulates data sent from the control section to feed it to the antenna 11. The control section writes data demodulated by the demodulation section into the memory section and reads data from the memory section to send it to the modulation, section. The memory section includes a non-rewritable area in which data is stored in a non-rewritable fashion and a rewritable area in which a requested data associated with an article to which the RFID label 5 is attached is stored, as a user area. In the non-rewritable area, an ID code is stored beforehand. The ID code is a specific code that uniquely identifies each RFID tag from others. RFID tags serve as a data carrier.

Figure 3:
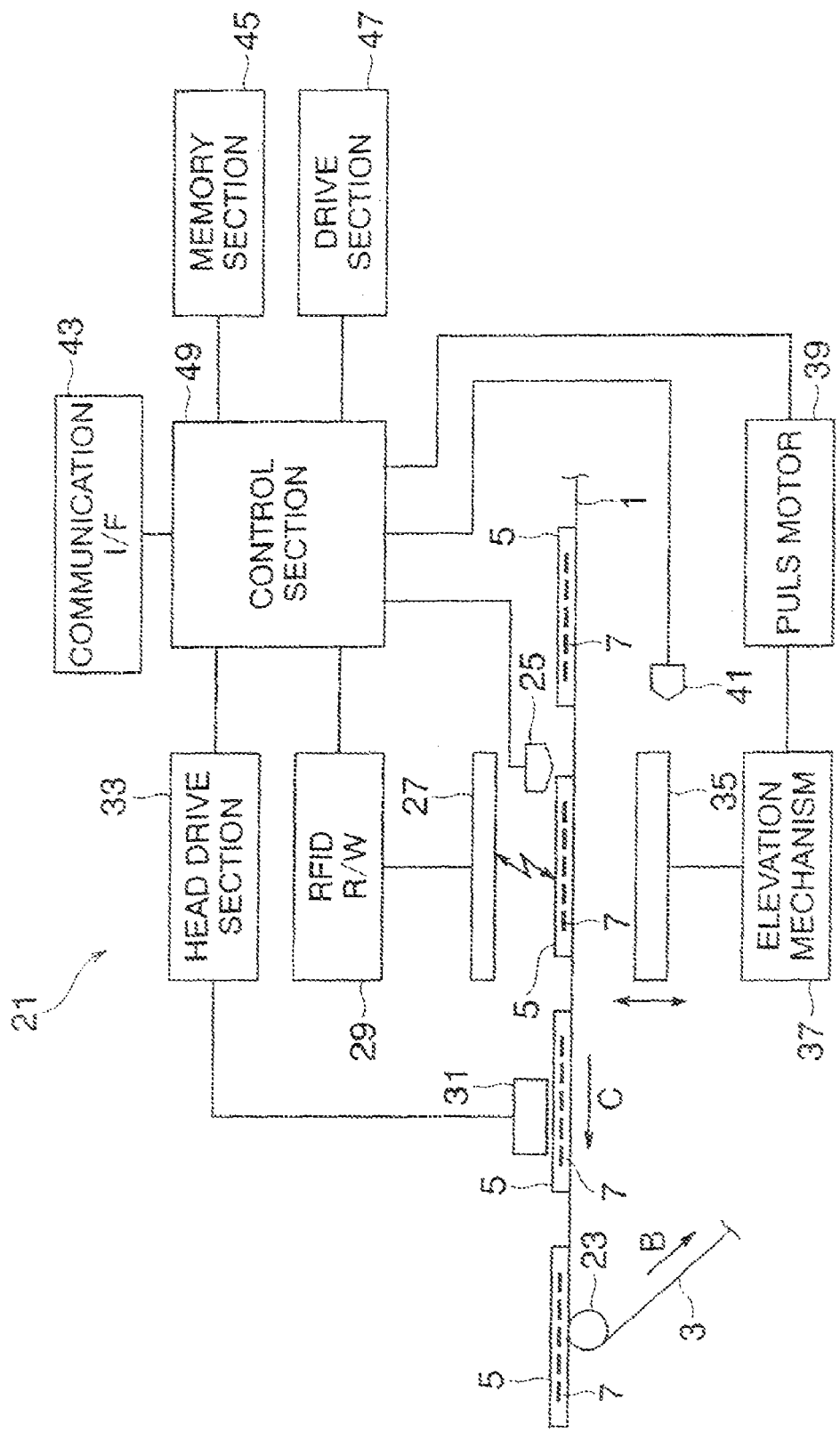
FIG. 3 is a block diagram illustrating construction of a printing apparatus according to one embodiment of the present invention.

FIG. 3 shows construction of an RFID label printer 21. The RFID label printer 21 carries out read/write operation in a non-contact manner to RFID tag 7 of respective RFID labels sequentially conveyed together with the base sheet 3, using a radio-communication. Simultaneously, necessary information is printed, on the surface of the label sheet 15 of the RFID label 5 that read/write operation is carried out to the RFID tag 7 thereof. Such operations of the RFID label printer 21 will be described.

In FIG. 3, the RFID label sheet 1 is housed in a label holder (not shown) of the RFID label printer 21 in a rolled state. A front end of the RFID label sheet 1 is taken out of the label holder in the direction C and led to a peeling roller 23 along a conveying path. The front end of the RFID label sheet 1 is bent more than 90 degrees along the surface of peeling roller 23 in a direction B shown in FIG. 3 and then the RFID label 5 is peeled from the label sheet 1 due to its stiffness when the RFID label 5 reaches the peeling roller 23. Further, the RFID label 5 peeled is discharged from a label issuing port (not shown) and the RFID label sheet; 1 is wound up by a take-up roller (not shown). Such operations are well known in the art.

A label sensor 25, an antenna 27 of an RFID reader/writer (interrogator) 29, and a print head 31, e.g., thermal head, are sequentially located in the order along the direction C of the sheet convey path from the label holder (Upper stream side in the conveying (Erection C) to the peeling roller (down, stream side). The label sensor 25 detects the RFID label 5 arranged on the label sheet 1 taken out of the label holder. For example, the sensor 25 detects the trailing edge of the RFID label 5 optic the sensor 25 detects the trailing edge of the RFID label 5, the RFID tag 7 of the RFID label 5 locates within the radio-communication, available area of the antenna 27 of the reader/writer 29.

The antenna 27 radiates electromagnetic waves (interrogation command) modulated by the RFID reader/writer 29 to the RFID tag 7 and receives electromagnetic waves modulated by the RFID tag 7 by using a backscatter modulation while the RFID tag 7 receives electromagnetic waves from the RFID reader/writer 29 through its antenna 11. A prescribed communication handshake (communication protocol) is carried out between the RFID reader/writer 29 and the RFID tag 7 before data such as ID code is sent from the RFID tag 7 to the RFID reader/writer 29, as is well known in the art. The antenna 27 is a relatively small external, size and has a frequency characteristic corresponding to a usable frequency band, i.e., 950 MHz to 956 MHz, in Japan, for example.

The RFID reader/writer 29 well known as an interrogator in the art reads out data stored in the memory section of the RFID tag 7 which locates within a communication area of antenna 27 and also writes data into the memory section of the RFID tag 7. In this embodiment, the RFID reader/writer 29 and the antenna 27 constitute a radio communication apparatus which performs a read/write operation to RFID tags 7 (data carriers) with the radio communication therebetween.

The print head 31 is driven by a head drive section 33 to print various information on the label sheet 15 of the RFID label 5. Thus, the print head 31 and the head drive section 33 constitute a printing means.

A dielectric element 35 having a desired relative dielectric constant is located at a location opposite to the antenna 27 through the sheet convey path of the RFID label sheet 1. The dielectric element 35 is moved upward or downward by an elevation mechanism 37 that is driven by a pulse-motor 39. The elevation mechanism 37 may be composed of, for example, a cam mechanism, a screw and gear construction, or a rack and pinion construction. The dielectric element 35 comes to the antenna 27 when the dielectric element 35 is moved upward and, goes away from, the antenna 27 otherwise. A home position sensor 41 is provided near the dielectric element 35 to detect, the dielectric element 35 which locates at the lower-most position (Home Position). The pulse-motor 39 and the elevation mechanism 37 constitute a moving means which varies a relative distance between the antenna 27 and the dielectric element 35.

When the dielectric element 35 locates at the Home Position, influence of the dielectric element 35 to the antenna 27 is not almost effected. Thus, frequency characteristic of the electromagnetic waves radiated from the antenna 27 is not changed. However, influence by the dielectric element 35 against the antenna 27 becomes large as the dielectric element 35 is moved upward. As a result, frequency characteristic of the electromagnetic waves radiated from the antenna 27 shifts to a low frequency.

The RFID label printer 21 further includes a communication interface 43, a memory section 45, a drive section 47 and a control section 49. The communication interface 43 is connected to a computer device that controls the RFID label printer 21 through the control section 49 to issue desired RFID labels. The drive section 47 controls a conveying mechanism that carries out a conveyance of the RFID label sheet 1 and a driving operation of the take-up roller rolling up the base sheet 3.

The memory section 45 includes a memory area in which various data are stored. In particular, as shown in FIG. 4, a dielectric element management table 51 and a pulse counter 53 are defined in the memory area. The dielectric element, management table 51 is composed of a position column and a required pulse column corresponding to the position column. In the position column, a distance between the lower-most position (HP) of the dielectric element 35 and the upper-most position (PN) thereof is divided at a regular interval into a plurality of positions (HP, P1, P2, . . . , PN) at which the dielectric element 35 is sequentially positioned by the elevation mechanism 37. In the required pulse column, a plurality of number of pulses (k0, k1, k2, . . . , kn) required to move the dielectric element 35 from the lower-most position (HP) to respective positions by the pulse motor 39 are set to each area corresponding to each position column. A distance between the lower-most position (HP) and the upper-most position (PN) may not be divided at regular intervals. For example, a first distance from the lower-most position to the middle position, and a second distance from the middle position to the upper-most position may be divided by different intervals and an interval, in the first distance may be greater than that in the second distance. It may also be determined such that the distance from the lowermost position (HP) to the upper-most position (PN) is divided at gradually decreasing intervals.

Figure 5:
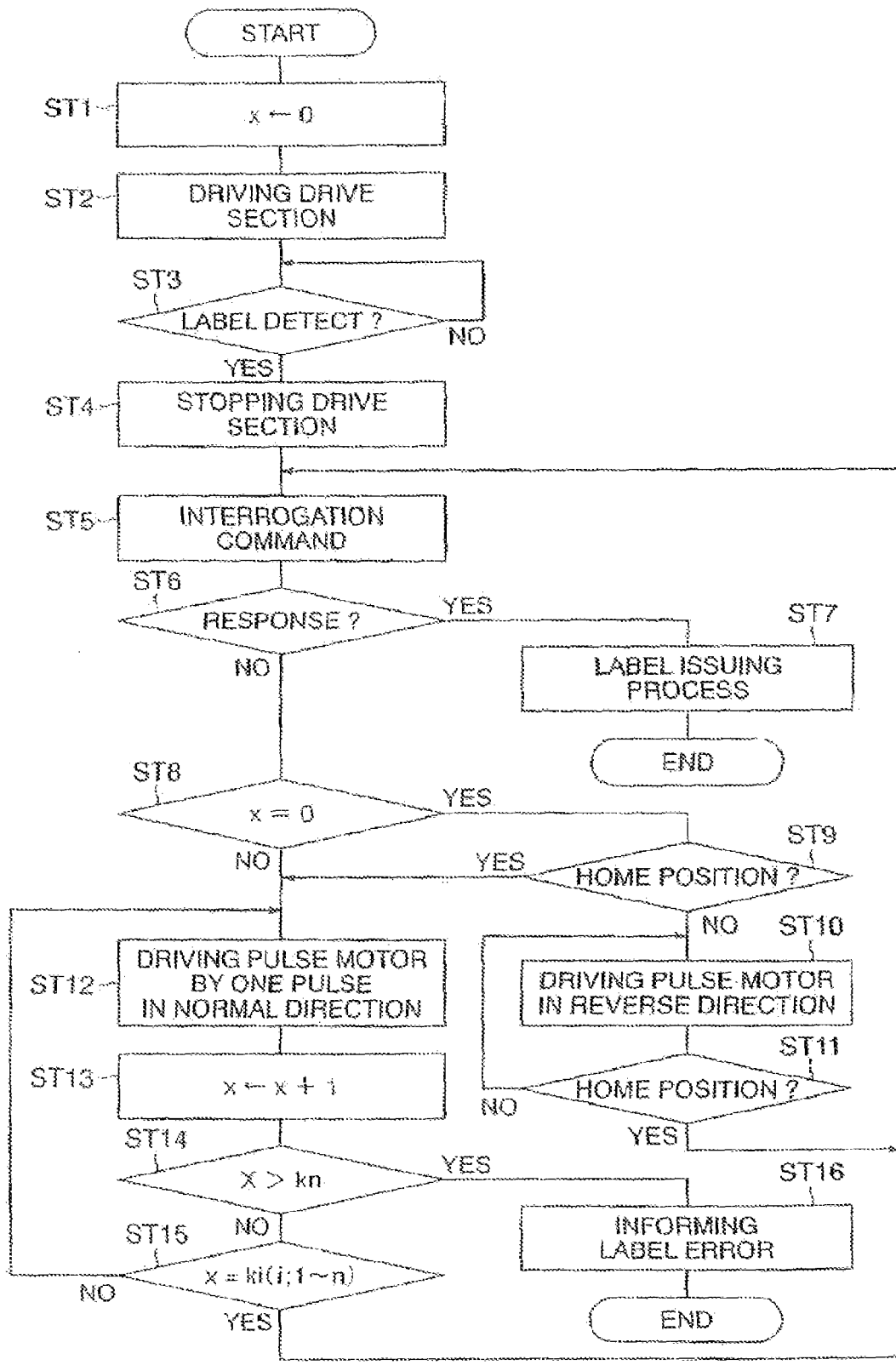
FIG. 5 is a flow chart illustrating main processes carried out by a control section of the printing apparatus shown in FIG. 3.

The control section 49 controls each section to carry out operation procedures shown in FIG. 5 when the computer device connected through the communication interface 43 commands issuance of RFID labels. The operation of issuance of RFID labels by the RFID label printer 21 will be described with reference to FIG. 5.

In FIG, 5, a count value X of the pulse counter 53 shown in FIG. 4 is reset to zero (0) in step (ST1) and the drive section 47 is started in step (ST2). Then, conveyance of the RFID label sheet is started and the control section 49 waits until the RFID label 7 is detected by the label sensor 12 (the No pass in step (ST3)). When the RFID label 5 is detected, the YES pass is taken in step (ST3) and the control section 49 commands stop of the drive section 47 in step (ST4).

Then, the control section 47 sends an RFID interrogation command to the RFID reader/writer 29 in step (ST5). In the RFID reader/writer 29, electromagnetic waves (carrier waves) are modulated based on the interrogation command and the modulated electromagnetic waves are radiated from the antenna 27. At this time, the control section 47 enters into a waiting state until an ID code is sent from the RFID tag 7 to the RFID reader/writer 29.

The modulated electromagnetic waves are received by the RFID tag 7 attached to the RFID label 5 and electric power is generated in the IC chip 9 as is well known in the art. An ID code stored in the memory section is read out to modulate electromagnetic waves based thereon and the modulated electromagnetic waves are radiated from the antenna 11 by a backscatter modulation. Prior to this operation, a prescribed handshake is carried out between the RFID tag 7 and the RFID reader/writer 29. The modulated electromagnetic waves from the antenna 11 is received by the antenna 27 of the RFID reader/writer 29 and are demodulated to obtain the ID code in the RFID reader/writer 29. The ID code is sent to the control section 49. When a prescribed handshake between the RFID reader/writer 29 and the RFID tag 7 is established and the control section 49 receives the ID code within a prescribed period, the YES pass is taken In step (ST6) and a label issuing process is carried out in step (ST7).

The label issuing process in step (ST7) will be described below. The control section 49 issues a re-start command to the drive section 47 and writes data to the RFID tag 7 of a target RFID label 5 in a non-contact fashion through the RFID reader/writer 29. The target RFID label 5 is a RFID label that has taken a prescribed handshake and faces the antenna 27. The target RFID label 5 is then conveyed to the print bead 31 and a required information is printed on the label sheet 15 (print area) of the target RFID label 5. This label issuing process is repeated until a requested number of RFID labels 5 are issued. In this case, data stored in respective RFID tags may be different from one another and information printed on respective RFID labels may also be different from one another. When the requested numbers of RFID labels 5 are issued, the operation of the drive section 49 is terminated and then, the label issuing process is finished.

On the other hand, when an ID code from the target RFID tag 7 is not received by the RFID reader/writer 29 even if a predetermined time passes after the RFID interrogation command is sent from the RFID reader/writer 29 (the NO pass in step (ST6)), the control section 49 judges whether a count value X of the pulse counter 53 is reset to zero (0) in step (ST8). When a count value X is zero, the YES pass is taken and the control section 49 judges whether the dielectric element 35 locates at a Home Position (HP) in step (ST9). When the home position sensor 41 can not detect the dielectric element 35, the control section 49 chives the pulse motor 39 in a reverse direction in step (ST10) because the dielectric element 35 does not locate at the Home Position (HP). Thus, the dielectric element 35 is moved toward the Home Position (HP) by the elevation mechanism 37. The control section 49 monitors the output of the home position sensor 41 in step (ST11) and continues drive of the pulse motor 39 until the home position sensor 41 detects the dielectric element 35.

When the dielectric element 35 is detected by the borne position sensor 41, the YES pass is taken in step (ST11) and the control section 41 resends an RFID interrogation command to the RFID reader/writer 29 in step (ST5). As a result, if an ID code is received by the RFID reader/writer 29 within the predetermined time, the YES pass is taken in step (ST6) and step (ST7) is carried out to issue RFID labels 5.

If the count value X of the pulse counter 53 is not zero in step (ST8) or the dielectric element 35 locates at a Home Position (HP) in step (ST9), the control section 41 drives the pulse motor 39 by one pulse in a normal direction in step (ST12). Thus, the dielectric element 35 is moved upwardly by the elevation mechanism 37 by an amount corresponding to one pulse. As a result, a relative distance between the dielectric element 35 and the antenna 27 is decreased by the amount corresponding to one pulse.

The control section 49 increases the count value X of the pulse counter 53 by one in step (ST13) and judges whether the count value X exceeds a required number of pulses kn corresponding to the upper-most position (PN) set in the dielectric element management table 51 in step (ST14).

In case that the count value X does not exceed the required number of pulses kn in step (ST14), the NO pass is taken and the control section further judges whether the count value X coincides with any one of the required number of pulses (k1-kn) corresponding to respective positions of the dielectric element 35 in the dielectric element management table 51 in step (ST15).

In case that the count value X does not coincide with any one of the required number of pulses (k1-kn) in step (ST15), the NO pass is taken and the steps (ST12, ST13, ST14 and ST15) are repeatedly executed until the count value X coincides with any one of the required number of pulses (k1-kn).

When the count value X coincides with any one of the required number of pulses (k1-kn) in step (ST15), the YES pass is taken and step (ST5) is executed. The control section 41 sends again an RFID interrogation command to the RFID reader/writer 29 to transfer the modulated electromagnetic waves to the target RFID tag 7. As a result, when the control section 41 receives the ID code from the target RFID tag 7 through the reader/writer 29 within a predetermined time, the YES pass is taken in step (ST6) and thus the control section 41 executes a label issuing process in step (ST7).

Thus, the control section 41 functions as a distance control means to adjust a relative distance between the antenna 27 of the RFID reader/writer 29 and the dielectric element 35 to a target distance by an elevation means including the elevation mechanism 37 and the pulse motor 39. The target distance enables radio-communication between the RFID reader/writer 29 and the target RFID tag 7 through the antenna 27.

In step (ST14), when the count value X of the pulse counter 53 exceeds a required number of pulses kn which corresponds to the uppermost position (PN) of the dielectric element 35 set in the dielectric element management table 51, the YES pass is taken and step (ST16) is executed. Since the communication between the RFID reader/writer 29 and the target RFID tag 7 is not performed even though the dielectric element 35 is moved or elevated to the upper-most position (PN), the control section 41 informs an operator of an error of communication with the target RFID tag 7. The error informing operation may be, for example, to send an error signal through the communication interface 43 to a computer device which commands a label issuing operation or to display an error information on the display (not shown) of the RFID label printer 21.

As described above, according to the above-described embodiment of the present invention, the dielectric element 35 locates at a position opposite to the antenna 27 of the RFID reader/writer 29. The dielectric element 35 is moved upward to approach the antenna 27 or moved downward to go away from the antenna 27 by the elevation mechanism 37 driven by the pulse motor 39.

When commanding the RFID label issuing operation to the RFID label printer 21 having the above-described construction, an RFID interrogation signal with radio waves is radiated from the antenna 27. If a response to the interrogation signal is sent within a predetermined period to the antenna 27 from the RFID tag 7 of the RFID label 5 on the RFID label sheet 1, then a label issuing process begins.

On the other hand, if a response to the interrogation signal is not sent from the RFID tag 7 to the antenna 27 within a predetermined period, the dielectric element 35 is elevated one step (pulse) by one step (pulse) alter the dielectric element 35 is moved to the lowermost position (HP) by the elevation mechanism 37. An RFID interrogation command is issued from the antenna 27 every time the dielectric element 35 reaches each position (P1, P2, . . . , PN) set; in the dielectric element management table 51.

If a response to the interrogation command is sent from the RFID tag 7 during this movement operation, the dielectric element 35 is maintained at a location that the response from the RFID tag 7 is confirmed to keep the relative distance between the antenna 27 and the dielectric element 35 and then the label, issuing process begins.

As described above, influence to the antenna 27 from the dielectric element 35 is almost zero when the dielectric element 35 locates at the lower-most position (HP). Therefore, frequency characteristic of the electromagnetic waves radiated from the antenna 27 is not changed. However, influence to the antenna 27 from the dielectric element 35 is effected and increased as the dielectric element 35 is elevated from the lower-most position (HP). As a result, frequency characteristic of the electromagnetic waves radiated from the antenna 27 is changed toward a lower frequency.

The antenna 27 has a frequency characteristic of 950 MHz to 956 MHz that is set as a frequency band of electromagnetic waves in UHF band for RFID usable in Japan. Therefore, when RFID labels 5 of which RFID tags 7 are designed such that its optimum frequency is 950 MHz are used, the RFID labels issuing process is executed in a state that the dielectric element 35 locates at the lower-most position (HP).

On the other hand, when RFID labels are used to be attached to articles such as books, an optimum frequency of each RFID tag 7 of RFID labels 5 is set at 1,000 MHz, considering beforehand that the optimum frequency thereof decreases about 50 MHz when RFID labels 5 are attached to such articles. When such RFID labels 5 are used to issue labels, the RFID labels issuing process is performed in a state feat the dielectric element 35 locates at a position elevated by a prescribed distance from the lower-most position (HP). When the dielectric element 35 locates at the elevated position, the frequency of electromagnetic waves radiated from the antenna 27 shifts to a lower frequency from the optimum frequency by about 50 MHz. Such an elevated position of the dielectric element 35 is determined based on a relative dielectric constant of the dielectric element 35.

Furthermore, when RFID labels are used to be attached to articles made of plastic, an optimum frequency of each RFID tag 7 of RFID labels 5 is set at 1,020 MHz, considering beforehand that the optimum frequency thereof decreases about 70 MHz when RFID labels 5 are attached to such articles. When such RFID labels 5 are used to issue labels, the dielectric element 35 is further elevated by the elevation, mechanism 37 from the above-described position at which RFID labels 5 for books are issued. The RFID labels issuing process is performed in a state that the dielectric element 35 locates at the further elevated position at which the frequency of electromagnetic waves radiated from the antenna 27 shifts to a further lower frequency from the optimum frequency by about 70 MHz.

In the above-described embodiment, the dielectric element 35 is elevated relative to the antenna of the RFID reader/writer. However, the antenna of the RFID reader/writer may be moved, instead of the dielectric element, to regulate a distance between the dielectric element and the antenna.

According to the above-described embodiment of the present invention, RFID labels issuing operation can be performed easily by an operator without discriminating RFID label sheets each of which has RFID tags thereon having an optimized frequency different from that on other RFID label sheets even if such RFID label sheets are mixedly used in a series of labels issuing operations.

The present invention has been described with respect to a specific embodiment. However, other embodiments based on the principles of the present invention should be obvious to those of ordinary skill in the art. Such embodiments are intended to be covered by the claims.

What is claimed is:

1. A radio-communication apparatus which carries out a data read/write operation to RFID labels peelably arranged on a base sheet, comprising:
   an antenna configured to perform transmission or reception of radio waves;
   a reader/writer configured to execute radio-communication with one of the RFID labels through the antenna to carry out the data read/write operation when the one of the RFID labels comes to a radio communicable area of the antenna;
   a dielectric element facing the antenna at a distance, the base sheet passing between the dielectric element and the antenna;
   a moving mechanism configured to regulate a relative distance between the dielectric element and the antenna if the reader/writer cannot execute radio-communication with the one of the RFID labels within a predetermined time; and
   a control section configured to control the operation of the moving mechanism to enable radio-communication between the reader/writer and the one of the RFID labels.

2. The apparatus according to claim 1, wherein each RFID label includes a data carrier.

3. The apparatus according to claim 1, wherein the dielectric element is moved step by step by the moving mechanism between a first position and a second position to be stopped at predetermined positions between the first and second positions.

4. The apparatus according to claim 3, wherein the reader/writer executes radio-communication with the one of the RFID labels through the antenna at each of the predetermined positions that the dielectric element stops until the reader/writer can execute radio-communication with the one of the RFID labels.

5. The apparatus according to claim 1, wherein each RFID label has a print area and, the apparatus further including, to act as a printer, a printing section configured to print information on the print area of the one of the RFID labels after the data read/write operation is executed, to the one of the RFID labels.

6. A method for enabling radio-communication between peelable RFID labels each having a data carrier on a rolled base sheet and a radio-communication apparatus, the radio-communication apparatus including an antenna, a reader/writer for executing a data read/write operation to the data carrier, a dielectric element, a moving mechanism for regulating a relative distance between the antenna and the dielectric element, and a control section for controlling the operation of the moving mechanism, comprising the steps of:
   conveying the RFID labels each having data carrier together with the base sheet between the antenna and the dielectric element;
   executing radio-communication between the reader/writer and the data carrier when one of the RFID labels comes to a radio-communicable area of the antenna;
   moving the dielectric element inward the antenna by the moving mechanism to regulate a relative distance between the dielectric element and the antenna if radio-communication between the reader/writer and the data carrier of the one of the RFID labels cannot be performed within a predetermined time; and
   controlling the operation of the moving mechanism until radio-communication between the reader/writer and the data, carrier of the one of the RFID labels is executed.

7. The method according to claim 6, wherein the moving step includes a sub step of moving the dielectric element step by step to stop the dielectric element at predetermined positions.

8. The method according to claim 7, wherein the controlling step includes a step of executing radio-communication between the reader/writer and the RFID label through the antenna when the dielectric element stops at any one of the predetermined, positions.

* * * * *